UNITED STATES PATENT OFFICE.

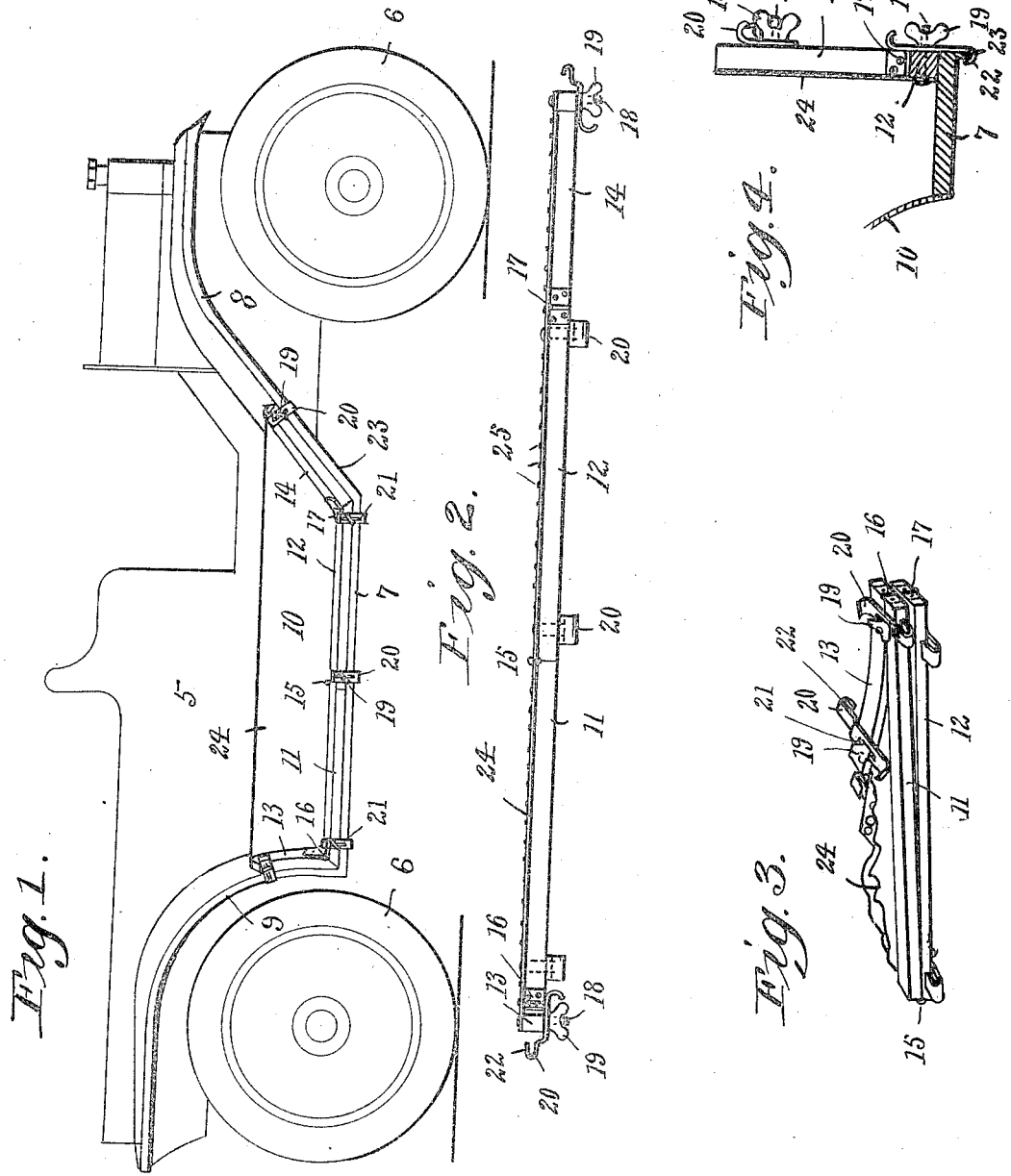

ARTHUR C. EDWARDS, OF BRIDGEPORT, CONNECTICUT.

AUTOMOBILE LUGGAGE-CARRIER.

1,179,812.  Specification of Letters Patent.  Patented Apr. 18, 1916.

Application filed November 27, 1915. Serial No. 63,716.

*To all whom it may concern:*

Be it known that I, ARTHUR C. EDWARDS, a citizen of the United States, and resident of Bridgeport, in the county of Fairfield and State of Connecticut, have invented certain new and useful Improvements in Automobile Luggage-Carriers, of which the following is a specification.

My invention refers to new and useful improvements in luggage carriers for automobiles and relates particularly to that class of carriers which are adapted to be attached to the foot board and mud guards of such car.

The purpose of the invention is to provide an inexpensive form of device which can readily be attached to the foot board of a car and in a manner to form an outer side, whereby packages may be supported upon the foot board in a way to prevent them from sliding off and further to design the carrier so that the same can be easily disconnected and folded together when not in use and placed in the tool box or under the seat of the car,—and finally to design the luggage carrier so that the same can be manufactured and sold at a reasonable figure.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 shows an outline side view of an automobile having one of my improved luggage carriers attached thereto. Fig. 2 shows a top plan view on an enlarged scale of the luggage carrier shown in Fig. 1. Fig. 3 shows a perspective view of the luggage carrier in a folded position, and Fig. 4 shows a further enlarged cross sectional view, of the luggage carrier, taken on line 4—4 of Fig. 1.

Referring in detail to the characters of reference marked upon the drawings 5 represents an automobile body. 6 the wheels, 7 a foot board, 8 the front mud guard, and 9 the rear mud guard. The features just enumerated may obviously be of the usual or any known design, except that in order to make my luggage carrier most effective the foot board and the mud guards should be of a sufficient width to form the bottom of a fair sized pocket when the outer side is inclosed by my improved luggage carrier.

In practice the inner edge portion 10 of the common forms of mud guards are deflected upward to engage the side of the body so as to form an inner wall and inclosure on the inner side of the running board and between the front and rear mud guard. This form of construction now exists in the majority of automobiles now upon the market and thus my improved luggage carier need only serve to form an outer side portion in a manner to produce a receptacle of which the foot board forms the bottom and the mud guards the two ends. The top is, of course, left open for the reception of the pieces of luggage to be carried.

My improved luggage carrier is thus attached to the edge portions of the foot board and mud guards in a manner to aline with the outer edge of the same. The luggage carrier is made up of a series of frame pieces hinged together and having means for their attachment to the foot board and mud guards. It further includes a suitable piece of canvas, curtaining or the like, which when the frame is attached, as shown in Fig. 1, is stretched tight from end to end to form the outer side portion of the pocket or receptacle.

The frame as will be seen is made up of four elongated strips 11, 12, 13 and 14 two of which, when the device is adjusted for use, are arranged in alinement one with the other and are hinged together at 15 so as to allow them to be folded in one against the other. The forward end frame member 14 is hinged to the top side of the member 12 and is adapted to be folded back upon it. The frame member 13 is hinged to the top side of the member 11 and may be folded in upon it in the same way that the end piece 14 is manipulated. The central hinge 15 is so arranged as to permit the two bottom frame members 11 and 12 to be folded sidewise, while the hinges 16 and 17 connecting the end pieces to the central members are arranged on the top side and permit the connected frame members to be folded back upon the bottom frame members. The bottom frame members 11 and 12 are arranged to lie flat upon the outer edge portion of the foot board 7 while the end frame members 13 and 14 similarly rest upon the top edge portion of the mud guards 8 and 9. Each of these frame members are provided with adjustable clamping devices which include a screw 18, a wing nut 19 and a sheet metal clamp 20 the latter being provided with an elongated slot 21 through which the screw passes, and the nut is designed to be secured against the face of the clamp. Each of these clamps are provided with a hook 22 which, as will be seen from Fig. 4, is designed to engage the under rib 23 of the foot board and mud guards.

The canvas 24 is attached to the inner side of each of the frame members by means of nails 25, screws or the like and when the parts are clamped to the mud guards, as shown, the said canvas will be stretched from end to end as shown in Fig. 1 of the drawing. When it is desired to detach the device the several wing nuts are loosened so as to permit the clamps to be unhooked. Then the frame members can be folded up in the manner described and as shown in Fig. 3. The canvas obviously likewise folds together in a way to allow the device to form a comparatively small bundle.

Having thus described my invention what I claim and desire to secure by Letters Patent is:—

1. In a luggage carrier for automobiles, the combination of a series of frame members, hinges connecting the same together to permit them to be folded one upon another, adjustable clamps attached to each of the frame members and adapted to engage the edge portions of the foot board and mud guards of an automobile, and a canvas secured to all of the frame members in a manner to extend from one mud guard to another when the luggage carrier is attached to the foot board and mud guards of an automobile.

2. In a luggage carrier for automobiles, the combination of two alined frame members adapted to fit upon the foot board of an automobile, hinges connecting said frame members together, an end frame member hinged to each of the said alined frame members and adapted to fit upon the mud guards of a car, adjustable clamps attached to each of the frame members and adapted to engage the edge portions of the foot board and mud guards of an automobile, and a collapsible side secured to all of the said frame members in a manner to extend from one mud guard to another when the luggage carrier is attached to the foot board and mud guards of an automobile.

Signed at Bridgeport in the county of Fairfield and State of Connecticut this 26th day of November A. D., 1915.

ARTHUR C. EDWARDS.

Witnesses:
C. M. NEWMAN,
RICHARD S. SWAIN.